(12) United States Patent
Tomii et al.

(10) Patent No.: US 8,441,666 B2
(45) Date of Patent: May 14, 2013

(54) PRINTING CONTROL DEVICE AND PRINTING CONTROL METHOD

(75) Inventors: Takuya Tomii, Nagano (JP); Hiroyuki Nagasawa, Veda (JP); Yukiharu Horiuchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 919 days.

(21) Appl. No.: 12/002,193

(22) Filed: Dec. 14, 2007

(65) Prior Publication Data

US 2008/0144100 A1    Jun. 19, 2008

(30) Foreign Application Priority Data

Dec. 14, 2006  (JP) ................................. 2006-337621

(51) Int. Cl.
*G06F 3/12* (2006.01)
(52) U.S. Cl.
USPC ......... 358/1.15; 358/1.1; 358/1.13; 358/1.14; 358/1.16; 358/1.18; 709/247
(58) Field of Classification Search ........................ None
See application file for complete search history.

(56) References Cited

U.S. PATENT DOCUMENTS

| | | | | |
|---|---|---|---|---|
| 5,413,419 A | * | 5/1995 | Oami et al. ..................... 400/61 |
| 5,930,551 A | * | 7/1999 | Nakazato et al. ................ 399/1 |
| 6,377,357 B1 | * | 4/2002 | Sato et al. .................... 358/1.15 |
| 6,388,765 B1 | * | 5/2002 | Nagano et al. ............... 358/1.18 |
| 6,409,401 B1 | * | 6/2002 | Petteruti et al. ................. 400/88 |
| 6,456,390 B1 | | 9/2002 | Okubo et al. |
| 6,665,088 B1 | | 12/2003 | Chiba et al. |
| 6,910,817 B2 | | 6/2005 | Fukano |
| 7,037,009 B2 | * | 5/2006 | Barrus et al. ..................... 400/76 |
| 7,557,938 B2 | * | 7/2009 | Sato ............................... 358/1.1 |
| 7,692,805 B2 | * | 4/2010 | Shima .......................... 358/1.14 |
| 2005/0232031 A1 | | 10/2005 | Fukano |
| 2006/0139679 A1 | * | 6/2006 | Barry et al. .................. 358/1.13 |

FOREIGN PATENT DOCUMENTS

| | | |
|---|---|---|
| JP | 10-228358 | 8/1998 |
| JP | 11-175268 | 7/1999 |
| JP | 2000-099285 | 4/2000 |
| JP | 2000158724 A | 6/2000 |
| JP | 2001010128 A | 1/2001 |
| JP | 2001-092604 | 4/2001 |
| JP | 2002-091740 | 3/2002 |
| JP | 2005-7762 | 1/2005 |

\* cited by examiner

*Primary Examiner* — Miya J Cato
(74) *Attorney, Agent, or Firm* — Nutter McClennen & Fish LLP; John J. Penny, Jr.; Christina M. Sperry

(57) ABSTRACT

A printing system and a printing control method for a printing system that enables automatically resumption of printing after recovering from a printing interrupt event without adding any changes to the conventional page printer, serial printer, line printer, or other type of printer and without needing to monitor which page is being printed when a printing interrupt event occurs. A reprint data management unit temporarily stores one page of print data to which page end information is added. A printing completion monitor monitors reception of a completion report that is sent by the printer when the printer reads the page end information. When the printing completion monitor detects the completion report, the reprint data management unit deletes the stored page of print data. A print interruption monitor detects if a printing interrupt event occurs during printing. If the print interruption monitor detects an interrupt and the cause of the interrupt is then corrected, the reprint data management unit sends the stored page of print data to the POS printer from the beginning again.

11 Claims, 7 Drawing Sheets

PRINTING CONTROL DEVICE AND PRINTING CONTROL METHOD

Priority is claimed under 35 U.S.C. §119 from Japanese Patent Application No. 2006-337621 filed on Dec. 14, 2006, which is hereby incorporated by reference in its entirety.

BACKGROUND OF THE INVENTION

1. Field of Invention

The present invention relates to a printing system that includes a host computer and a printer that executes a printing process based on print data sent from the host computer, and to a printing control method for the printing system.

2. Description of Related Art

Printing systems that include a host computer and a printer that is communicably connected to the host computer and executes a printing process based on print data sent from the host computer are known from the literature. The printers used in such printing systems include page printers that print by page unit, serial printers that print one character or one dot at a time, and line printers that print by line unit.

Page printers enable printing in page units by generating and storing a print image for one page in an internal image buffer based on the print data sent from the host computer.

When a prescribed amount of print data is received from the host computer, serial printers and line printers generally store the print data in a print buffer by line unit and clear the data in the print buffer when the printing process for one line ends. Serial printers and line printers thus generally do not store print data for an entire page.

When an interrupt event that interrupts execution of the printing process occurs, such as when the paper runs out, a paper jam occurs, or a cover is opened, while the printer is executing a printing process, the printer may clear the print data that was previously received and stored in the image buffer or print buffer and the host computer may clear the remaining print data that has not been sent to the printer as part of the interrupt recovery process. The print data for the part of the printing process following the interrupt is cleared in order to prevent such problems as printing only part of the print data after operation is restored. See Japanese Unexamined Patent Appl. Pub. JP-A-2005-07762, for example.

However, if all of the print data in the image buffer or print buffer is cleared when an interrupt event occurs, the operator must tell the host computer to repeat the printing process for the interrupted page and the print data must be written to the buffer again in order to resume the interrupted printing process.

In order to eliminate the need for the operator to reassert the print command when an interrupt event occurs, a printing control method that saves the print data in the printer instead of clearing the print data and automatically resumes printing from where the page was interrupted when the interrupt event is corrected is also known from the literature. This printing control method is described further below with reference to FIG. 6 and FIG. 7.

The host computer described below has a spooler and a language monitor. The spooler can receive and temporarily store a plurality of print requests in a hard disk and sequentially send the print requests to a printer. Disposing a language monitor between the spooler and the printer enables bidirectional communication between the host computer and the printer. A roll paper printer that prints to roll paper is used by way of example below.

When the language monitor receives a print start request from the spooler (step S61), the language monitor checks the status of the printer and waits for a printing enabled response from the printer (step S62 and step S63). When a printing enabled response is received, the language monitor tells the spooler that preparation for the printing process is completed (step S64).

When data A for one printing unit of the print data for one print job is sent from the spooler (step S65), the language monitor temporarily stores this unit of transmitted print data A, queries the printer status again, waits for a printing enabled response (step S66 and step S67), and then sends this unit of print data A to the printer (step S68). When transmission ends, the language monitor reports the transmitted data size to the spooler (step S69). The printer that received this unit of transmitted print data A also executes the printing process.

When the data storage size report is received from the language monitor, the spooler passes the next unit of transmission data B to the language monitor (step S70). The spooler clears the previously stored transmission data A and stores the next unit of transmitted print data B that was just received. The language monitor again checks the printer status and waits for a printing enabled response (step S71, step S72), and sends the unit of print data B to the printer (step S73). The printer thus receives this next unit of print data B and continues the printing process.

If the paper runs out in the printer executing the printing process, a no-paper report is sent from the printer to the language monitor (step S74) and the language monitor retries sending the stored unit of transmission data B until the printer is restored to a printing enabled state. When roll paper is loaded into the printer, the recovery process completed, and a printing enabled response is returned to the language monitor (step S75), the language monitor resends the unit of transmitted print data B to the printer (step S76), and when transmission is completed reports the size of the transmitted data to the spooler 1 (step S77).

The printer that received the print data B continues the printing process from the beginning of the new roll of paper. More specifically, if the roll paper runs out while printing the print data for "1" on the first page 50a in FIG. 7, printing continues at the beginning of the new paper roll 50b from some point in the unit of print data (the middle of the number "1" in this example) that was being printed when the interrupt occurred. The spooler then sends the next unit of print data C (step S78), and steps S66 to S73 repeat unless another printer interrupt event occurs. When a printing termination report is received from the spooler, the language monitor executes a printing termination process (step S79), reports completion of the termination process to the spooler, and the spooler then deletes the print job.

Processes enabling the printer to automatically resume a printing process after recovering from an interrupt event are also known from the literature. Japanese Unexamined Patent Appl. Pub. JP-A-2002-91740 teaches a reprinting method that monitors the page number where the printing process is interrupted, automatically re-reads the print data from the page where printing was interrupted based on the detected page number, and resends the print data to the printer.

Japanese Unexamined Patent Appl. Pub. JP-A-H10-228358 teaches a serial printer that prints the print data for each line and simultaneously sequentially stores the print data for the one line to backup memory. If a printing interrupt event occurs, the printer reads the print data for the page where printing was interrupted from the backup memory and automatically reprints the page.

When a new roll of paper is loaded, the printing control method described in FIG. 6 resumes printing from where printing the print data ("1") on the first page was interrupted, and the resulting printer output is therefore unusable. As a result, the first page must be printed again.

Furthermore, the reprinting method taught in JP-A-2002-91740 must monitor and store the number of the page that was being printed when the printing interrupt event occurred.

The printer taught in JP-A-H10-228358 must also have backup memory with sufficient capacity to accumulate the line by line print data sent from the host computer and store print data for one page. This inflates the manufacturing cost and power consumption by serial printers and line printers that otherwise do not need to store one page of print data, and is thus not practical.

SUMMARY OF THE INVENTION

A printing system and a printing control method for a printing system that enables the automatic resumption of printing after recovering from a printing interrupt event without adding any changes to the conventional page printer, serial printer, line printer, or other type of printer and without needing to monitor which page is being printed when a printing interrupt event occurs.

A first aspect of at least one embodiment of the invention is a printing control method for a host computer, the printing control method including the steps of: adding page end information denoting the end of print data for one page to print data that is sent from the host computer to a connected printer; storing the one page of print data to which the page end information was added; sending the print data to which the page end information was added to the printer; receiving a completion report that is sent from the printer when the printer reads the page end information; deleting the stored page of print data when the completion report is received; and monitoring if a printing interrupt event occurs while the printer is printing the one page of print data, and resending the stored page of print data from the beginning to the printer if a printing interrupt event is detected.

Another aspect of at least one embodiment of the invention is a device including: a page end information adding unit that adds page end information denoting the end of print data for one page to print data that is sent to a connected printer; a print data management unit that stores the one page of print data to which the page end information was added; a transmission control unit that sends the print data to which the page end information was added to the printer; a printing completion monitoring unit that monitors receiving a completion report that is sent from the printer when the printer reads the page end information; and a print interruption monitoring unit that monitors the occurrence of a printing interrupt event while printing the one page of print data; wherein when the printing completion monitoring unit detects a completion report, the print data management unit deletes the stored page of print data, and sends the stored page of print data from the beginning to the printer if the print interruption monitoring unit detects that a printing interrupt event occurred in the printer.

When the host computer receives the printing completion report, which is sent from the printer when the printer reads the page end information that is appended to the print data, the host computer clears the previously stored page of print data. The host computer thus retains the one page of print data until the printing completion report is received from the printer. As a result, if a printing interrupt event occurs while printing the page, the host computer can send the same page of print data to the printer again.

The host computer also monitors if a printing interrupt event occurs while the printer is printing a page, and resends the stored page of print data from the beginning to the printer if a printing interrupt event is detected. The print data can therefore be automatically reprinted when the cause of the interrupt is corrected, and unusable printer output can be prevented when a page is reprinted automatically.

Furthermore, because the page of print data stored by the host computer can be simply resent to the printer when a printing interrupt event occurs, it is not necessary to monitor which page was being printed when the printing interrupt event occurred as it is with the related art.

The printing interrupt event is not limited to any particular event, and can be any event that causes the printing process to be interrupted when processing the print data for any part of a page. Examples of such events include paper jams, running out of ink, detecting a paper size that is different from the stored paper size, a cover being opened, and running out of paper when printing to a continuous web such as roll paper.

The printer in this printing system and the printing control method executed by this printing system can therefore be a page printer that prints in page units, a serial printer that prints one character or one dot at a time, a line printer that prints in line units, or any other type of printer.

In the printing control method according to another aspect of at least one embodiment of the invention the resending step adds updated page end information to the print data sent to the printer; and the receiving step deletes the stored page of print data when a completion report for the updated page end information is received.

In the device according to another aspect of at least one embodiment of the invention the transmission control unit sends print data to which updated page end information is added to the printer; and the print data management unit deletes the stored page of print data when the printing completion monitoring unit detects a completion report for the updated page end information.

Because updated page end information is added to the print data that is resent to the printer, and the stored page of print data is deleted when a completion report for the updated page end information is received, the stored page of print data is not cleared if the updated page end information and the completion report do not match. As a result, if the host computer receives a completion report that does not match the updated page end information when the reprint process executes, the host computer will not erroneously delete the print data and the reprint process can execute correctly.

Other objects and attainments together with a fuller understanding of the invention will become apparent and appreciated by referring to the following description and claims taken in conjunction with the accompanying drawings.

DESCRIPTION OF PREFERRED EMBODIMENTS

A printing system according to a preferred embodiment of the present invention is described below with reference to the accompanying figures.

Figure 1:
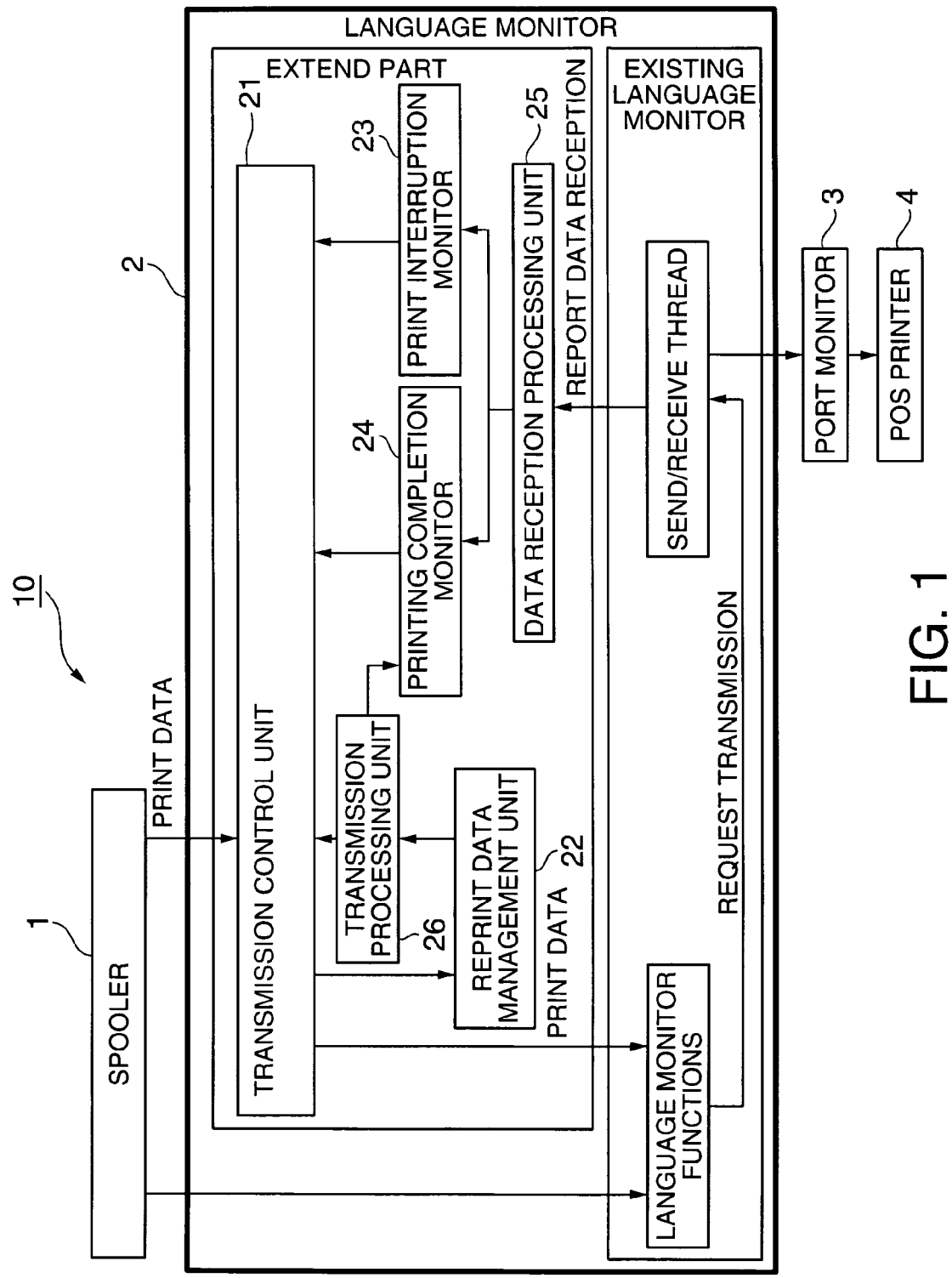
FIG. 1 is a block diagram describing a printing system according to a preferred embodiment of the invention.

FIG. 1 is a block diagram describing the internal processes of a printing system according to a preferred embodiment of the invention. This printing system 10 includes a point-of-sale (POS) printer 4 and a host computer that has a spooler 1, a language monitor 2, and a port monitor 3. The spooler 1 is a program for temporarily storing print data in memory or a hard disk of the host computer, and sending data according to the print status of the POS printer 4, and is a function of the printer driver. In this embodiment of the invention the spooler 1 (page end information adding unit) adds a process ID request command (page end information) to the end of the print data for one page and passes the print data to the language monitor 2. Further description of the other functional parts of the host computer is omitted.

The process ID request command is a command that requests the POS printer 4 to return a process ID response (completion report) indicating that print data processing was completed. More specifically, when the POS printer 4 reads the process ID request command added to the end of the print data while processing the print data, the POS printer 4 returns the process ID response to the host computer. This embodiment of the invention adds a process ID request to the end of the print data for one page before sending the print data to the POS printer. When the POS printer finishes the printing process for one page of print data, it returns the process ID response corresponding to the process ID request to the host computer.

The host computer knows that the printing process for one page has ended when it receives this process ID response, and then sends the print data for the next page to the POS printer.

In addition to the functions of a conventional language monitor, the printing system 10 according to this embodiment of the invention has new functions provided by a transmission control unit 21, a reprint data management unit 22, a print interruption monitor 23, a printing completion monitor 24, and a data reception processing unit 25.

Figure 2:
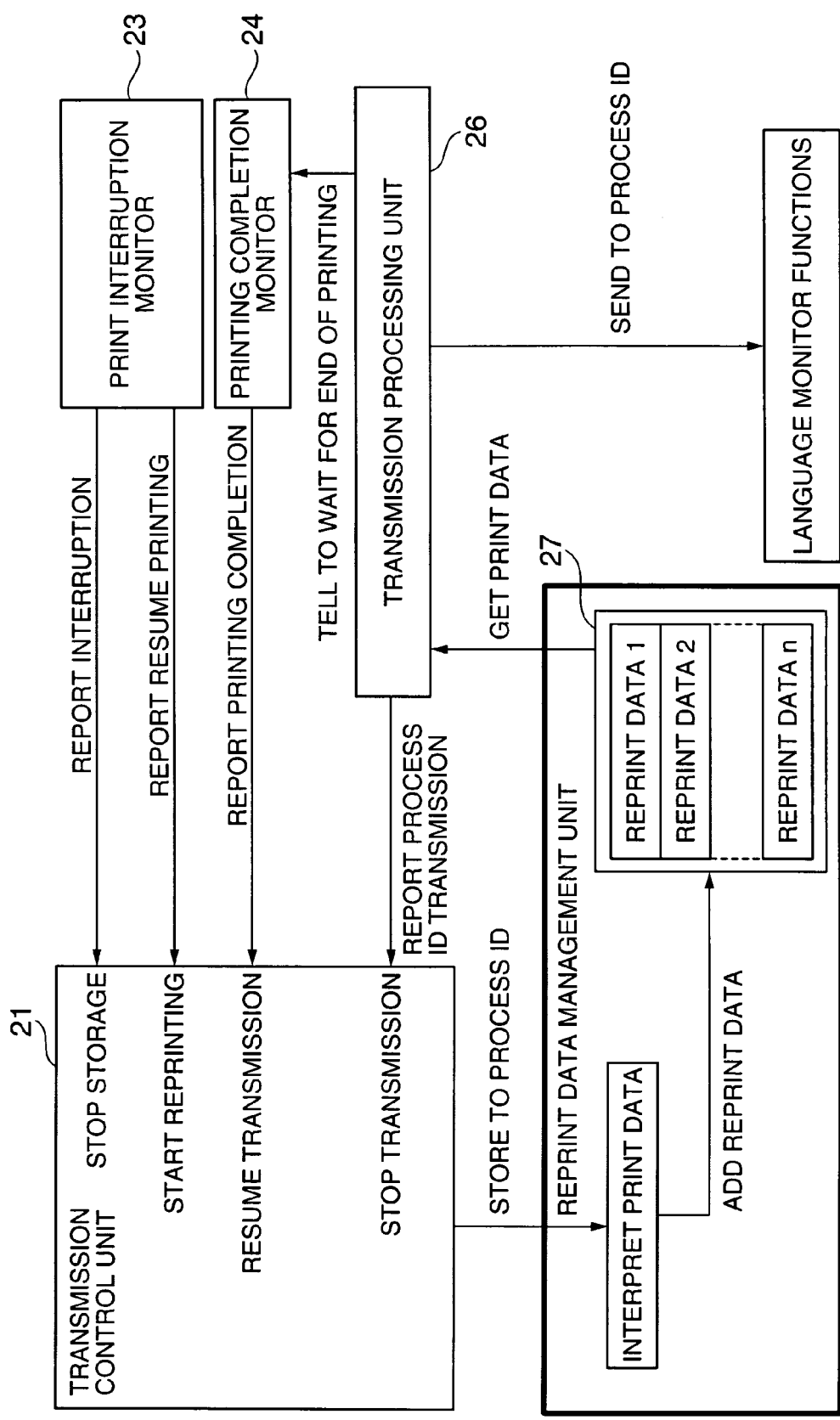
FIG. 2 is a function block diagram describing the reprinting process that the host computer executes when a printing interrupt event occurs in the printer according to the present invention.

FIG. 2 is a function block diagram that focuses on the reprinting process executed by the host computer when a printing interrupt event occurs in the POS printer 4 according to this embodiment of the invention.

The reprint data management unit 22 of the language monitor 2 interprets the print data passed from the language monitor 2, and stores the print data up to the process ID request command as reprint data in the data storage unit 27. The reprint data management unit 22 sends the interpreted print data through the transmission processing unit 26 to the POS printer 4 until the process ID request command is detected or printing is interrupted.

When the reprint data management unit 22 detects the process ID request command that is added to the print data sent from the spooler 1, the transmission processing unit 26 reports to the transmission control unit 21 that the process ID request command was sent to the POS printer 4. When this transmission report is received, the transmission control unit 21 stops sending print data to the POS printer 4. The transmission processing unit 26 also tells the printing completion monitor 24 to look for the process ID response to the process ID request command, that is, to monitor the printing completion and standby report from the POS printer 4.

When the process ID response indicating that printing has ended is received from the POS printer 4 through the data reception processing unit 25, the printing completion monitor 24 tells the transmission control unit 21 that the next print data can be sent.

The print interruption monitor 23 monitors whether a printing interrupt event occurs while the POS printer 4 is executing the printing process. The print interruption monitor 23 can be configured to determine that a printing interrupt event has occurred in the POS printer 4 if a response from the POS printer 4 to a printer status query sent to the POS printer 4 by the language monitor 2 is not received, and to monitor printing interrupt events based on printing interrupt event reports from the POS printer 4. If a printing interrupt event is detected, the transmission control unit 21 stops storing print data in the data storage unit 27.

If the cause of the printer interrupt is corrected and the POS printer 4 can resume printing, the transmission control unit 21 is instructed to restart printing and print data is stored in the data storage unit 27 again.

The printing control method of this printing system is described in further detail below with reference to FIG. 3 and FIG. 4.

Figure 3:
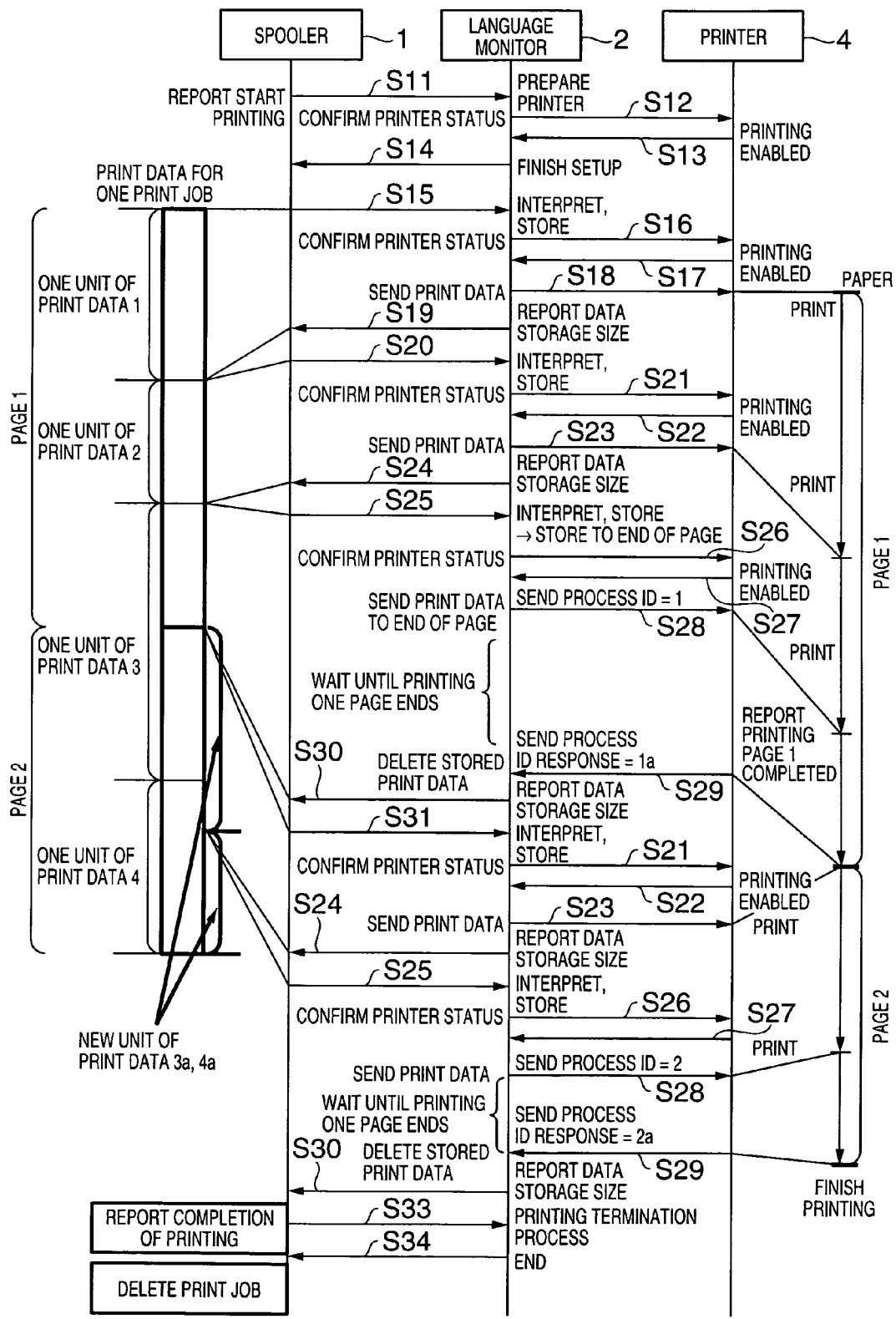
FIG. 3 is a sequence diagram describing the printing control method during normal operation of the printing system of the invention.
Figure 4:
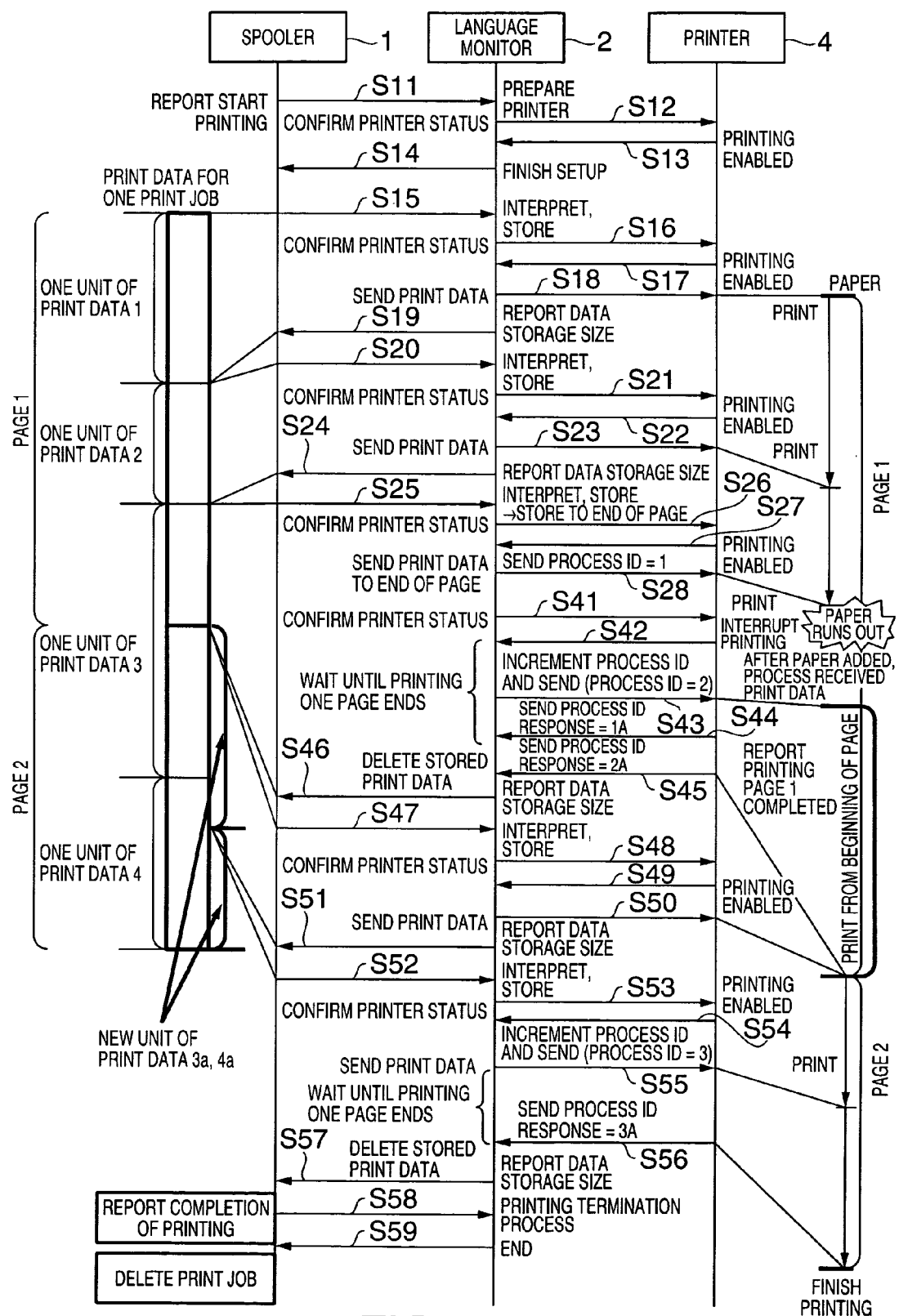
FIG. 4 is a sequence diagram describing the printing control method when a printing interrupt event occurs in the printing system of the invention.

FIG. 3 is a sequence chart describing the printing control method during normal operation.

When the language monitor receives a start printing signal from the spooler 1 (step S11), the language monitor 2 queries the status of the POS printer 4 (step S12), waits to receive a printing enabled response from the POS printer 4 (step S13), and then reports to the spooler 1 that preparation for the printing process is completed (step S14).

When print data 1 for one unit of the print data for one print job is sent from the spooler 1 (step S15), the transmission control unit 21 of the language monitor 2 temporarily stores the received unit of print data 1 in the data storage unit 27 of the reprint data management unit 22, queries the status of the POS printer 4 again (step S16), waits for the printing enabled response (step S17), and then sends the unit of print data 1 to the POS printer 4 when the printing enabled response is received (step S18). When data transmission is completed, the language monitor 2 reports the transmitted data size to the spooler 1 (step S19). The POS printer 4 that received the unit of print data 1 runs the printing process to print the data.

In response to the data storage size report from the language monitor 2, the spooler 1 passes the next unit of print data 2 to the language monitor 2 (step S20). This newly received unit of print data 2 is added to and stored with the unit of print data 1 stored in the data storage unit 27. The language monitor 2 again queries the status of the POS printer 4 (step S21), waits for the printing enabled response (step S22), and then sends the next unit of print data 3 to the POS printer 4 when the printing enabled response is received (step S23). The POS printer 4 runs the printing process to print the data after the next unit of print data 1 is received.

As described above, the language monitor 2 reports the transmitted data size to the spooler 1 (step S24) when data transmission is completed. The spooler 1 then passes the next unit of print data 3 to the language monitor 2 (step S25) in response to the data storage size report from the language monitor 2. Because the process ID request command (process ID=1), which is a page break command, is added to this unit of print data 3 and the reprint data management unit 22 detects the process ID request command in the print data, only the print data to the end of the page is stored in the data storage unit 27.

The language monitor 2 again queries the status of the POS printer 4 (step S26), waits for the printing enabled response (step S27), and then sends the print data to the end of the page, including the process ID request command, to the POS printer 4 when the printing enabled response is received (step S28).

The printing completion monitor 24 of the language monitor 2 monitors the end of printing, and waits until printing one page ends. The POS printer 4 that received the print data to the end of the first page prints, and when printing ends, sends a process ID response (=1a) denoting completion of printing one page to the language monitor 2 (step S29). When the printing completion monitor 24 detects the process ID response denoting the end of printing, the reprint data management unit 22 clears all three units of print data 1, 2 3 cumulatively stored in the data storage unit 27.

The language monitor 2 reports the data storage size of the print data sent in step S28 to the spooler 1 (step S30). The spooler 1 then passes a new unit of print data 3a starting from the beginning of the second page in response to the data storage size report from the language monitor 2 (step S31). As shown in the FIG. 3, the print data passed to the language monitor 2 at this time may include the next unit of transmission data within the allowed size. This is because page breaks do not exist between the transmitted print data units.

Steps S21 to S30 (or a subset thereof) thereafter repeat unless a printing interrupt event occurs in the POS printer 4. Note that the process ID added to the new print data 4a for the second page is incremented from the previous process ID.

After the language monitor 2 receives the process ID response (=2a) corresponding to the process ID=2 added to the end of second page, the language monitor 2 executes the printing termination process when the printing completion report is received from the spooler 1, and the spooler 1 then deletes the print job when the termination process completion report is received from the language monitor 2 (step S33 and step S34).

By thus adding a process ID (page end information) denoting the end of the print data for one page to the print data, the POS printer 4 returns a process ID response corresponding to the appended process ID. When the language monitor 2 receives the corresponding process ID response and thus determines that the printing process for the first page ended normally, the one page of print data stored in the data storage unit 27 is cleared and control goes to the printing process for the second page.

The printing process when a printing interrupt event occurs is described next. FIG. 4 is a sequence chart describing the printing control method when a printing interrupt event, such as running out of paper, occurs in the POS printer 4 between steps S28 and S29 in FIG. 3. The process from step S11 to step S28 is the same as the process described in FIG. 3, and further description thereof is omitted below.

In step S28 print data to the end of the first page and including the process ID request command is sent to the POS printer 4. A printing interrupt event such as running out of paper then occurs while the POS printer 4 is printing, and the POS printer 4 returns a print interrupt report in response to the printer status query from the language monitor 2 (step S41 and step S42). In response, the transmission processing unit 26 of the language monitor 2 resends the one page of print data stored in the data storage unit 27 to the POS printer 4 (step S43), and the POS printer 4 resumes printing the first page based on this reprint data.

In step S43, the transmission processing unit 26 increments the process ID to process ID=2 (updated page end information) and sends the updated process ID.

Because the POS printer 4 stores the print data (containing process ID=1) that was received before the paper ran out, the POS printer 4 returns the process ID response=1A, which corresponds to the process ID request command read when processing the print data after paper is added, to the language monitor 2 (step S44).

When the POS printer 4 executes the reprint process and reads the process ID request command (process ID=2) added to the reprint data, the POS printer 4 returns the corresponding process ID response (=2A) to the language monitor 2 (step S45). When this process ID response is received, the language monitor 2 knows that the printing process was completed to the end of the first page, deletes the print data for the first page stored in the data storage unit 27, and again reports the data storage size of the data storage unit 27 to the spooler 1 (step S46).

The spooler 1 then passes a new unit of print data 3a to the language monitor 2 and stores data from the beginning of the second page to the data storage unit 27 (step S47).

The language monitor 2 then queries the status of the POS printer 4 (step S48), waits for the printing enabled response (step S49), and then sends the new unit of print data 3a to the POS printer 4 (step S50). When transmission ends, the data storage size is reported to the spooler 1 (step S51). The POS printer 4 executes the printing process to print the second page based on the received unit of new print data 3a.

The spooler 1 passes the next new unit of print data 4a to the language monitor 2 based on the data storage size reported by the language monitor 2 (step S52). The newly received unit of print data 4a is added to and stored with the unit of print data 3a stored in the data storage unit 27.

The language monitor 2 then again queries the status of the POS printer 4 (step S53), waits for the printing enabled response (step S54), and then sends the new unit of print data 4a to the POS printer 4 (step S55). The POS printer 4 continues the printing process to print the second page based on the received unit of new print data 3a.

In step S55 the transmission processing unit 26 increments the process ID to process ID=3 (updated page end information) and sends the updated process ID.

The printing completion monitor 24 of the language monitor 2 waits until printing the second page ends. The POS printer 4 that received the print data to the end of the second page prints, and when printing ends sends a process ID response (=3A) denoting completion of printing the second page to the language monitor 2 (step S56). When the printing completion monitor 24 detects the process ID response 3A denoting the end of printing, the reprint data management unit 22 clears all of the second page print data 3a and 4a stored in the data storage unit 27.

The language monitor 2 then reports the data storage size of the data storage unit 27. After the language monitor 2 receives the printing completion report from the spooler 1, the language monitor 2 executes the printing termination process, and the spooler 1 then deletes the print job when the termination process completion report is received from the language monitor 2 (step S57, step S58, and step S59).

The transmission processing unit 26 in this embodiment of the invention thus increments (updates) the process ID each time print data is sent to the POS printer 4. By incrementing the process ID, problems caused by proceeding with the printing process for the next page as a result of erroneously determining that the printing process ended because a process ID response was received can be prevented if, for example, the language monitor 2 receives (in step S44) the process ID response (=1A) to the process ID (=2) that was added to the print data for which printing failed due to an interrupt while printing the print data sent in step S43.

More specifically, the printing process for the reprint data of the first page that is sent to the POS printer 4 in step S43 is executed without interruption until the language monitor 2 receives the process ID response (=2A) corresponding to the process ID (=2) added to the reprint data. Therefore, if a process ID response (=1A) that does not correspond to the current process ID (=2) is received while executing the reprint process for the first page, the reprint process will not be erroneously interrupted, and the desired print output can be achieved in a reprint process resulting from a printing interrupt event.

Figure 5:
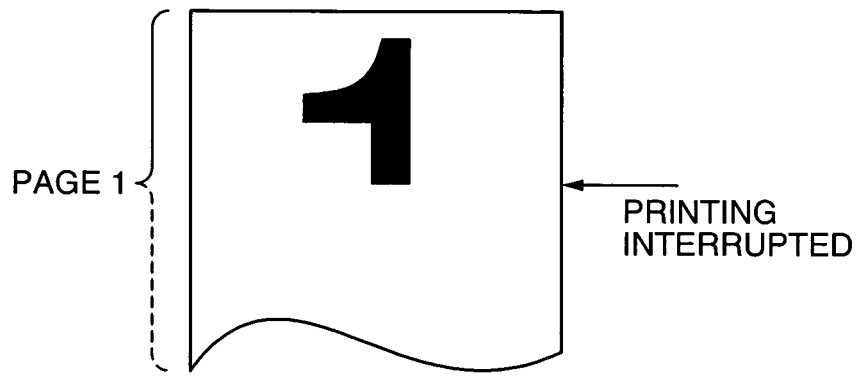
FIG. 5 shows images of the output of the printing system according to the present invention.
Figure 5:
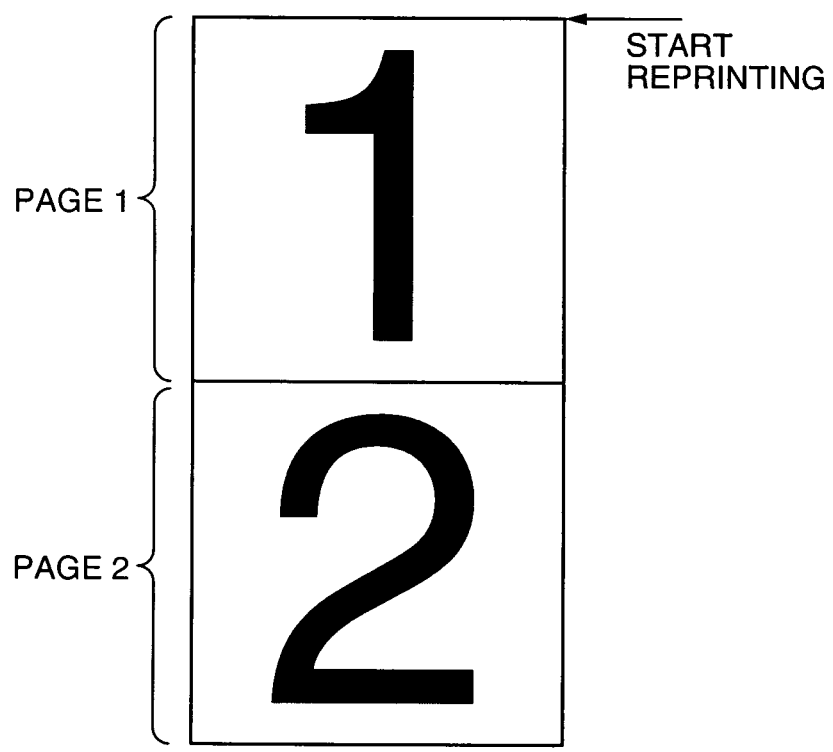
Figure 6:
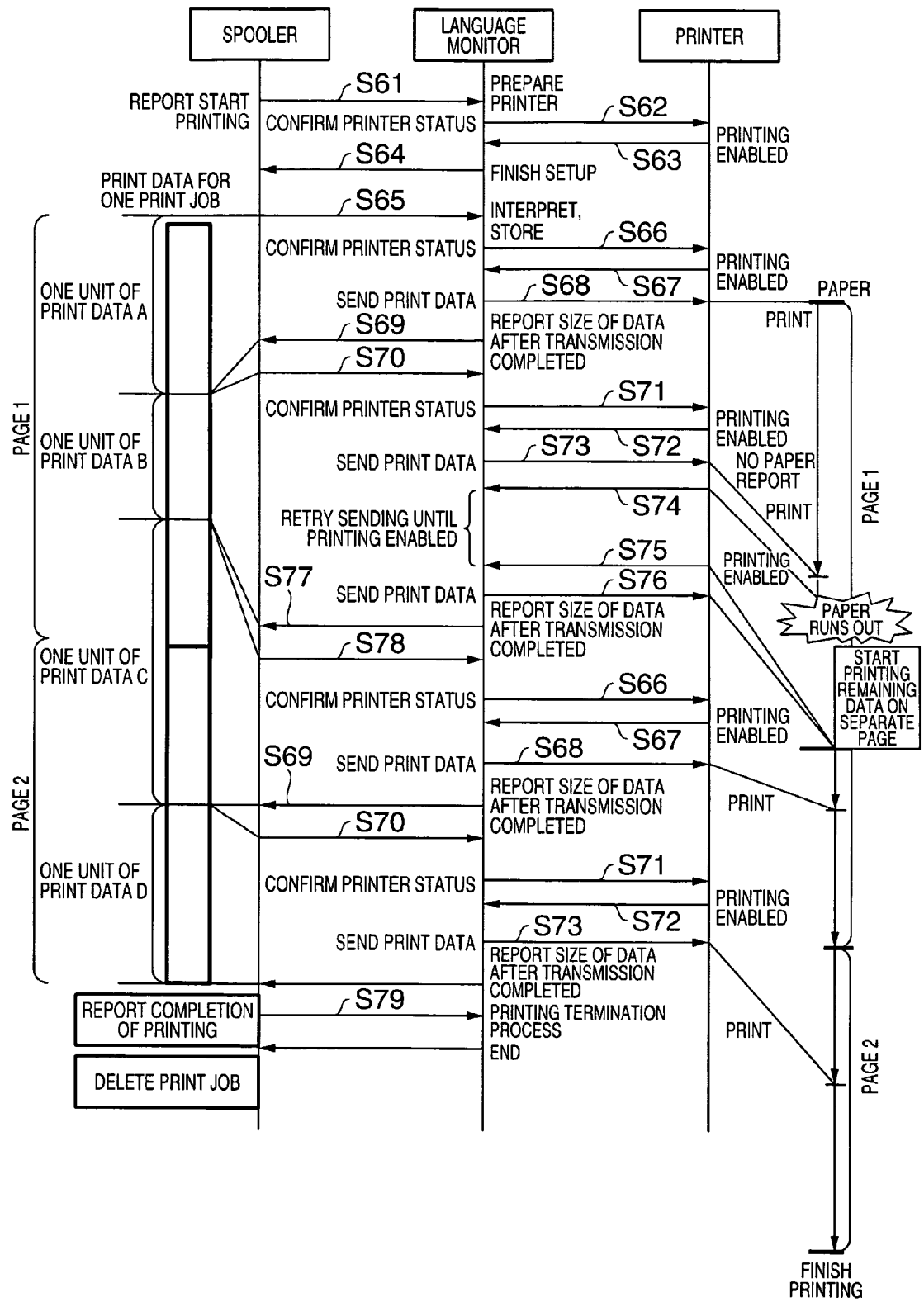
FIG. 6 is a sequence diagram describing the printing control method when a printing interrupt event occurs in a printing system according to the related art.
Figure 7:
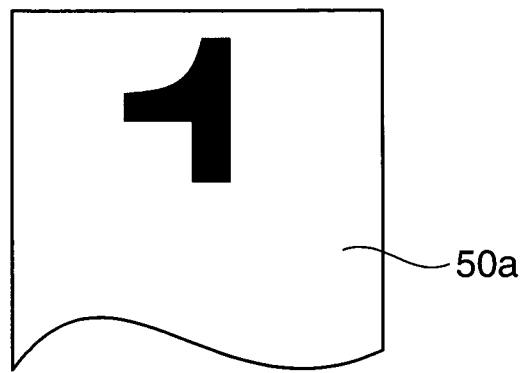
FIG. 7 shows images of the output of the printing system according to the related art.
Figure 7:
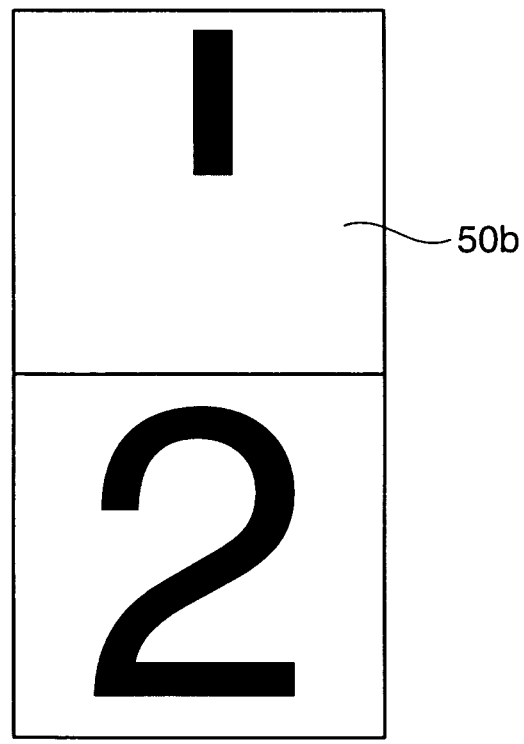

As described above, the print data stored in the data storage unit 27 of the reprint data management unit 22 is not cleared until a process ID response corresponding to the process ID is received, that is, until printing to the end of the page is completed. As a result, if a printing interrupt event occurs, printing starts appropriately from the beginning of the page when printing resumes, as shown in FIG. 5. Wasteful printing of unusable output is therefore prevented, and paper resources can be used more efficiently.

This embodiment has been described using, by way of example the roll paper supply running out while printing in a POS printer that prints to roll paper, but the invention is not limited to this type of POS printer. For example, the invention can also be used when an interrupt event such as a paper jam occurs, the ink is depleted, or a cover opens in a laser printer or other type of page printer. The invention can also be used when an interrupt event such as a paper jam occurs, the ink runs out, a cover is opened, or a different paper size than the stored paper size is detected in a serial printer such as an inkjet printer that prints one character or one dot at a time.

It should be understood that the invention thus described may be varied in many ways. Such variations are not to be regarded as a departure from the spirit and scope of the invention, and all such modifications as would be understood to one skilled in the art are intended to be included within the scope of the following claims.

What is claimed is:

1. A printing control method, comprising:
adding a process ID request command to an end of print data for one page that is sent from a host computer to a connected printer, the process ID request command requesting from the printer a completion report denoting that processing of the print data was completed;
storing the one page of print data to which the process ID request command was added;
sending the print data to which the process ID request command was added to the printer;
receiving the completion report that is sent from the printer when the print data processing was completed;
deleting the stored one page of print data when the completion report is received; and
monitoring if a printing interrupt event occurs while the printer is printing the one page of print data, and, if a printing interrupt event is detected, adding a process ID request command to the stored one page of print data sent to the printer that is incremented form the process ID request command, sending the stored one page of print data including the incremented process ID request command to the printer, and deleting the stored page of print data including the incremented process ID request command when a completion report for the stored one page of print data including the added processing ID request command is received.

2. The printing control method described in claim 1, further including the step of resuming printing the stored one page of print data.

3. The printing control method described in claim 1, further including the step of incrementing the process ID request command each time the print data is sent to the printer.

4. The printing control method described in claim 1, wherein said deleting step is performed when a process ID response corresponds to the process ID request command.

5. The printing control method described in claim 1, wherein the process ID request command comprises a numerical value, and the incremented process ID request command comprises a numerical value that is increased from the numerical value of the process ID request command.

6. The printing control method described in claim 5, wherein the host computer increases the numerical value.

7. The printing control method described in claim 1, wherein if the printing interrupt event is detected, the host computer increments the process ID request command and adds the incremented process ID request command to the stored one page of print data.

8. A computer program stored on a non-transitory computer readable medium,
wherein said computer program performs the steps of the printing control method described in claim 1.

9. A device comprising:
a page end information adding unit that adds a process ID request command to an end of print data for one page that is sent to a connected printer, the process ID request command requesting from the printer a completion report denoting that processing of the print data was completed;
a print data management unit that stores the one page of print data to which the process ID request command was added;
a transmission control unit that sends the print data to which the process ID request command was added to the printer;
a printing completion monitoring unit that monitors reception of a completion report that is sent from the printer when the printer completes the print data processing; and
a print interruption monitoring unit that monitors if a printing interrupt event occurs while printing the one page of print data;
wherein when the printing completion monitoring unit detects a completion report, the print data management unit deletes the stored page of print data, and,
if the print interruption monitoring unit detects that a printing interrupt event occurred in the printer, a process ID request command is added to the stored one page of print data sent to the printer that is incremented from the process ID request command, the stored one page of print data including the incremented process ID request command is sent to the printer, and the stored page of print data including the incremented process ID request command is deleted when a completion report for the stored one page of print data including the added processing ID request command is received.

10. The device described in claim 9, further including a transmission processing unit that increments the process ID request command each time the print data is sent to the printer.

11. The device described in claim 9, wherein the print data management unit deletes the stored one page of print data when a process ID response corresponds to the process ID request command.

* * * * *